United States Patent
Schmatz et al.

(10) Patent No.: US 11,265,160 B2
(45) Date of Patent: Mar. 1, 2022

(54) VIRTUAL MEMORY EXTENSION LAYER FOR HARDWARE SECURITY MODULES

(71) Applicant: International Business Machines Corporation, Armonk, NY (US)

(72) Inventors: Martin Schmatz, Rueschlikon (CH); Navaneeth Rameshan, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/277,536

(22) Filed: Feb. 15, 2019

(65) Prior Publication Data
US 2020/0266982 A1    Aug. 20, 2020

(51) Int. Cl.
| | |
|---|---|
| H04L 29/06 | (2006.01) |
| H04L 9/08 | (2006.01) |
| G06F 9/54 | (2006.01) |
| H04L 9/30 | (2006.01) |

(52) U.S. Cl.
CPC ............ H04L 9/0877 (2013.01); G06F 9/541 (2013.01); H04L 9/0825 (2013.01); H04L 9/30 (2013.01)

(58) Field of Classification Search
CPC ....... H04L 9/0877; H04L 9/0825; H04L 9/30; H04L 9/0631; H04L 9/3066; H04L 9/3252; G06F 9/541
See application file for complete search history.

(56) References Cited

U.S. PATENT DOCUMENTS

| | | | | |
|---|---|---|---|---|
| 7,278,582 | B1* | 10/2007 | Siegel | G06F 21/72 235/451 |
| 9,571,279 | B2 | 2/2017 | Kancharla et al. | |
| 9,972,005 | B2 | 5/2018 | Wong et al. | |
| 9,973,496 | B2 | 5/2018 | Boenisch et al. | |
| 2011/0268265 | A1* | 11/2011 | Lathrop | G06F 21/80 380/28 |

(Continued)

OTHER PUBLICATIONS

Hari Tadepalli, "Intel Quick Assist Technology with Intel Key Protection Technology in Intel Server. Platforms Based on Intel Xeon Processor Scalable Family," 2017, White paper Intel key Protection Tehnology, p. 1-7 (Year: 2017).*

(Continued)

*Primary Examiner* — Harunur Rashid
(74) *Attorney, Agent, or Firm* — Daniel Morris; Otterstedt, Wallace & Kammer, LLP

(57) ABSTRACT

A key management system includes a hardware security module (HSM) with a secure memory; an HSM driver implementing an API, interfaced with the HSM to provide handles to cryptographic objects stored on the secure memory of the HSM; and a shim layer interfaced with the HSM driver. The layer is generally configured to enable a client application to interact with the HSM via the driver, i.e., for the HSM to manage cryptographic objects for the client, notwithstanding the layer. External memory storage resides outside the HSM and is interfaced with the layer. The method includes instructing (at the layer) to: (i) encrypt cryptographic objects from the HSM (with the help of the driver) and store the resulting encrypted objects at respective memory locations on the storage, to free up memory space; and (ii) store handles to such cryptographic objects along with references to said respective memory locations, on the storage.

18 Claims, 7 Drawing Sheets

(56) References Cited

U.S. PATENT DOCUMENTS

| | | | |
|---|---|---|---|
| 2011/0289324 A1* | 11/2011 | Yellepeddy | H04L 9/08 |
| | | | 713/189 |
| 2012/0102334 A1* | 4/2012 | O'Loughlin | G06F 12/1408 |
| | | | 713/189 |
| 2015/0358161 A1* | 12/2015 | Kancharla | G06F 21/602 |
| | | | 713/164 |
| 2018/0082076 A1 | 3/2018 | Murray | |
| 2018/0109508 A1 | 4/2018 | Wall et al. | |
| 2019/0089529 A1* | 3/2019 | Conway | H04L 9/3247 |
| 2020/0226332 A1* | 7/2020 | Patil | H04L 63/0823 |

OTHER PUBLICATIONS

Kartashov, et al., Virtual HSM Implementation in OpenVZ Containers, FRUCT'15 Proceedings of the 15th Conference of Open Innovations Association FRUCT, pp. 184-188, Saint-Petersburg, Russia—Apr. 21-25, 2014.

Cifuentes, et al., Poor Man's Hardware Security Module (PMHSM): A Threshold Cryptographic Backend for DNSSEC, LANC '16 Proceedings of the 9th Latin America Networking Conference, Oct. 13-14, 2016, pp. 59-64.

\* cited by examiner

VIRTUAL MEMORY EXTENSION LAYER FOR HARDWARE SECURITY MODULES

BACKGROUND

The invention relates in general to the field of computer-implemented methods for managing cryptographic objects in a computerized environment comprising one or more hardware security modules (HSMs), as well as related computerized systems. In particular, it is directed to methods addressing limitations in terms of memory space on the HSMs.

Key management relates to the management of cryptographic keys and other cryptographic objects in a cryptosystem, which involves operations such as the generation, storage, use, destruction and replacement of keys. Key management requires specific cryptographic protocols, key servers, and other procedures.

Consistently, a key management system (KMS) is a system that generates, distributes and, more generally, manages cryptographic keys for clients (devices, applications). A KMS may handle several aspects of security, these ranging from secure generation of keys up to secure key handling and storage on the clients. A KMS typically includes a backend functionality for key generation, distribution, and replacement. It may further integrate specific client functionalities for injecting keys, storing and managing keys on the client devices.

A KMS typically includes one or more hardware security modules (HSMs), which are devices designed to protect and manage keys for performing cryptographic operations (i.e., crypto-processing) and strong authentication. Such modules are physical devices (e.g., plug-in cards) that typically attach directly to a computer (e.g., a network server). HSMs typically comprise secure crypto-processor chips, i.e., dedicated chips of microprocessors carrying out cryptographic operations, mostly embedded in a packaging with various physical security measures, and providing some degree of tamper resistance.

HSMs are typically designed to provide tamper evidence and tamper resistance (e.g., to delete keys upon tamper detection). HSM systems are sometimes able to securely back up keys they manage. HSMs are typically clustered to provide high availability and, as such, conform to high-availability requirements of modern data center environments. They may notably form part of infrastructures such as online banking applications and public key infrastructures.

Key management and key management systems are becoming increasingly important for data security, as well as security of connected devices and applications, be it due to the current development of the Internet of Things and cloud computing.

One way to achieve data security is to use ubiquitous data encryption. Each encryption requires a key. As the volume of encrypted data rapidly grows, as well as the number of users of such encrypted data, the number of keys required increases very steeply. Accordingly, an increasingly large numbers of keys need be managed with high-performance, e.g., to enable cloud scale functionality.

Among other basic rules, such keys should never be visible in plain form. Plain keys (keys in their plain form) should only reside inside a (hardware) secure enclosure such as provided by a HSM, e.g., certified by an authority such the Federal Information Processing Standards (FIPS). Whenever a key is exported from a HSM, it is encrypted (wrapped) with another key on the HSM. This secures the key for it to be stored outside of the HSM.

However, this also means that an encryption step has to be performed on the plain key bits, which, given the large number of keys managed, is time consuming (several milliseconds on state-of-art HSMs). Thus, one would ideally want to have as many keys as possible that reside inside a HSM in plain form, so as to be always readily available for use. This, however, is not feasible due to hardware limitations of the HSMs.

As a hardware component, a HSM needs a driver and an application programming interface (API), in order to be accessible from software. A prominent industry standard driver API for HSMs is the so-called PKCS #11 (or PKCS #11 for short). Many software packages are designed and implemented to use this standard API.

SUMMARY

According to a first aspect, the present invention is embodied as a computer-implemented method for managing cryptographic objects, such as cryptographic keys. This method involves a key management system, which notably comprises a hardware security module (HSM) equipped with a secure memory. The system further includes a HSM driver, implementing an application programming interface, or API (e.g., implemented as an API library), interfaced with the HSM to provide handles to cryptographic objects stored on the secure memory of the HSM. In addition, a shim layer is interfaced with the HSM driver. The shim layer is nevertheless configured to enable a client application to interact with the HSM via the HSM driver (i.e., for the HSM to manage cryptographic objects for the client application), notwithstanding the presence of the shim layer. Moreover, the system includes external memory storage means, which reside outside the HSM and are interfaced with the shim layer. The method basically comprises, at the shim layer, instructing to: (i) encrypt cryptographic objects from the HSM (this operation being performed with the help of the HSM driver, i.e., via the latter) and store the resulting encrypted objects at respective memory locations on the external storage means, in order to be able to free up memory space on the secure memory; and (ii) store, on the external storage means, handles to such cryptographic objects along with references to said respective memory locations.

According to another aspect, the invention is embodied as a key management system for managing cryptographic objects. As discussed above, the system comprises a HSM, an HSM driver, a shim layer, and external memory storage means. Consistently with the above method, the shim layer is configured to instruct to encrypt (via the HSM driver) cryptographic objects and store encrypted versions thereof at respective memory locations on the external storage means, in order to be able to free up memory space on the secure memory, in operation. In addition, the shim layer is designed to store handles to such cryptographic objects along with references to said respective memory locations, on the external storage means.

According to a final aspect, the invention is embodied as a computer program product for managing cryptographic objects in a key management system such as described above. The computer program product comprises a computer readable storage medium having program instructions embodied therewith. The program instructions are executable by one or more processors, to cause to take steps according to the present methods.

Systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 2 is a high-level diagram of a key management system in a single-HSM configuration, whereas

The accompanying drawings show simplified representations of the underlying computerized systems and devices. Similar or functionally similar elements in the figures have been allocated the same numeral references, unless otherwise indicated.

DETAILED DESCRIPTION

Given the tamper resistant enclosure of a certified hardware security model (HSM), and the tight space and power requirements of such devices, the amount of memory available within the HSM's secure enclosure is extremely limited (typically a few megabytes). For example, assuming keys of 256 bits and a secure memory capacity of one megabyte, a HSM device can only hold 4 000 keys. This is clearly not sufficient for cloud scale operation. As present Inventors have therefore realized, it would be desirable to (virtually) enhance the amount of memory available on a HSM. They have accordingly devised a solution, which works transparently for the client applications and does not require to modify the HSMs and corresponding driver libraries, as now described in detail.

The following description is structured as follows: general embodiments and high-level variants are described in sect. 1, while the next section addresses more specific embodiments and technical implementation details (sect. 2).

1. General Embodiments and High-Level Variants

In reference to FIGS. 1-5, a first aspect of the invention is described, which concerns a computer-implemented method for managing cryptographic objects (hereafter COs), such as cryptographic keys.

Figure 1:
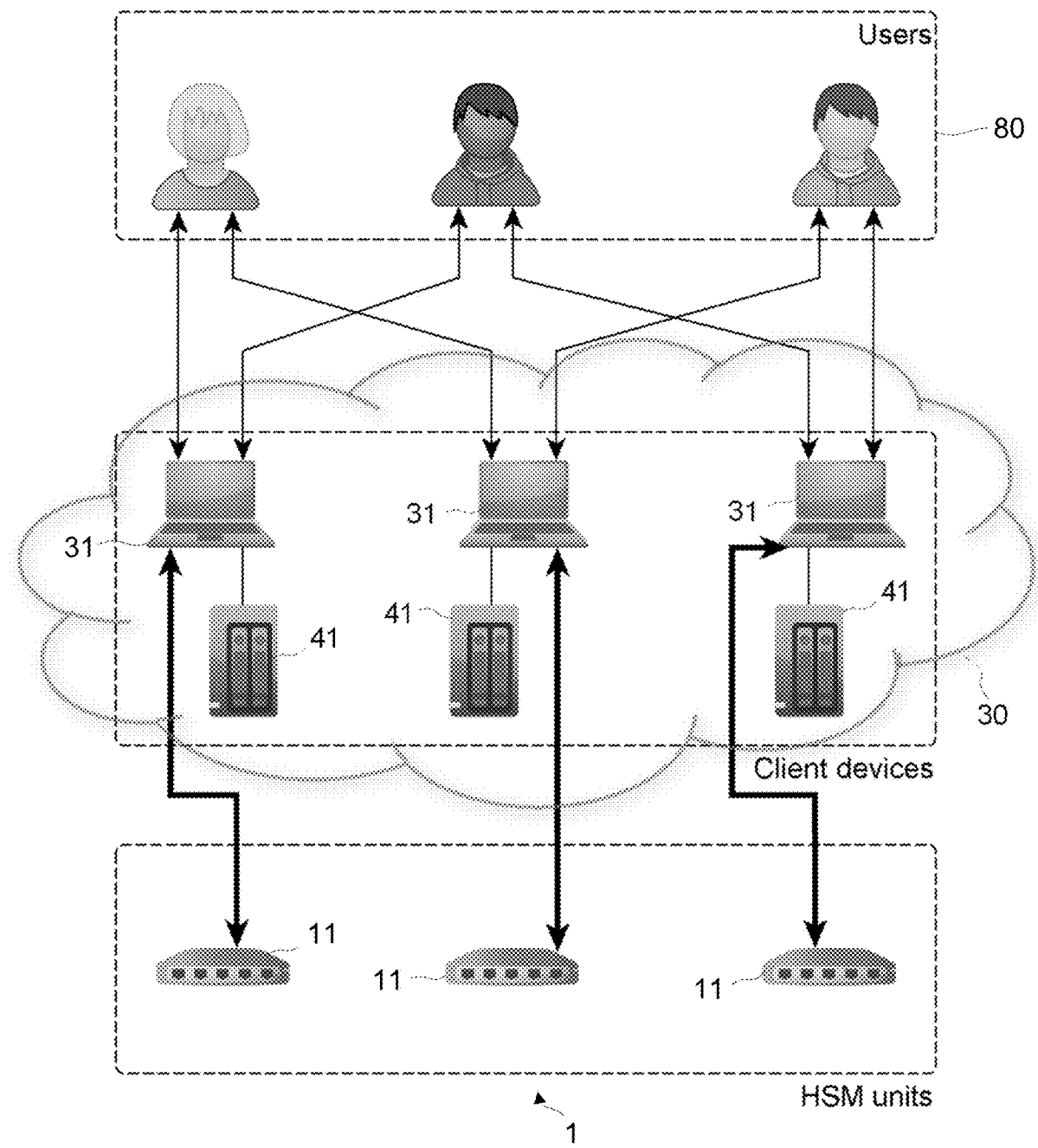
FIG. 1 schematically illustrates selected components and actors of a key management system according to embodiments, where clients operate in a cloud and interact with hardware security modules (HSMs) on behalf of users, as in embodiments.
Figure 2:
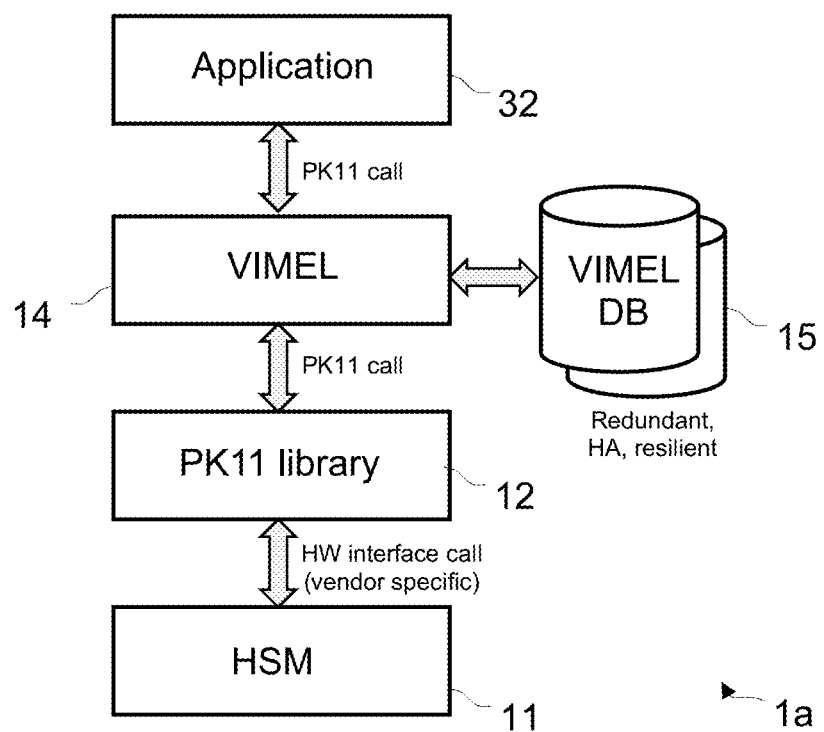
Figure 3:
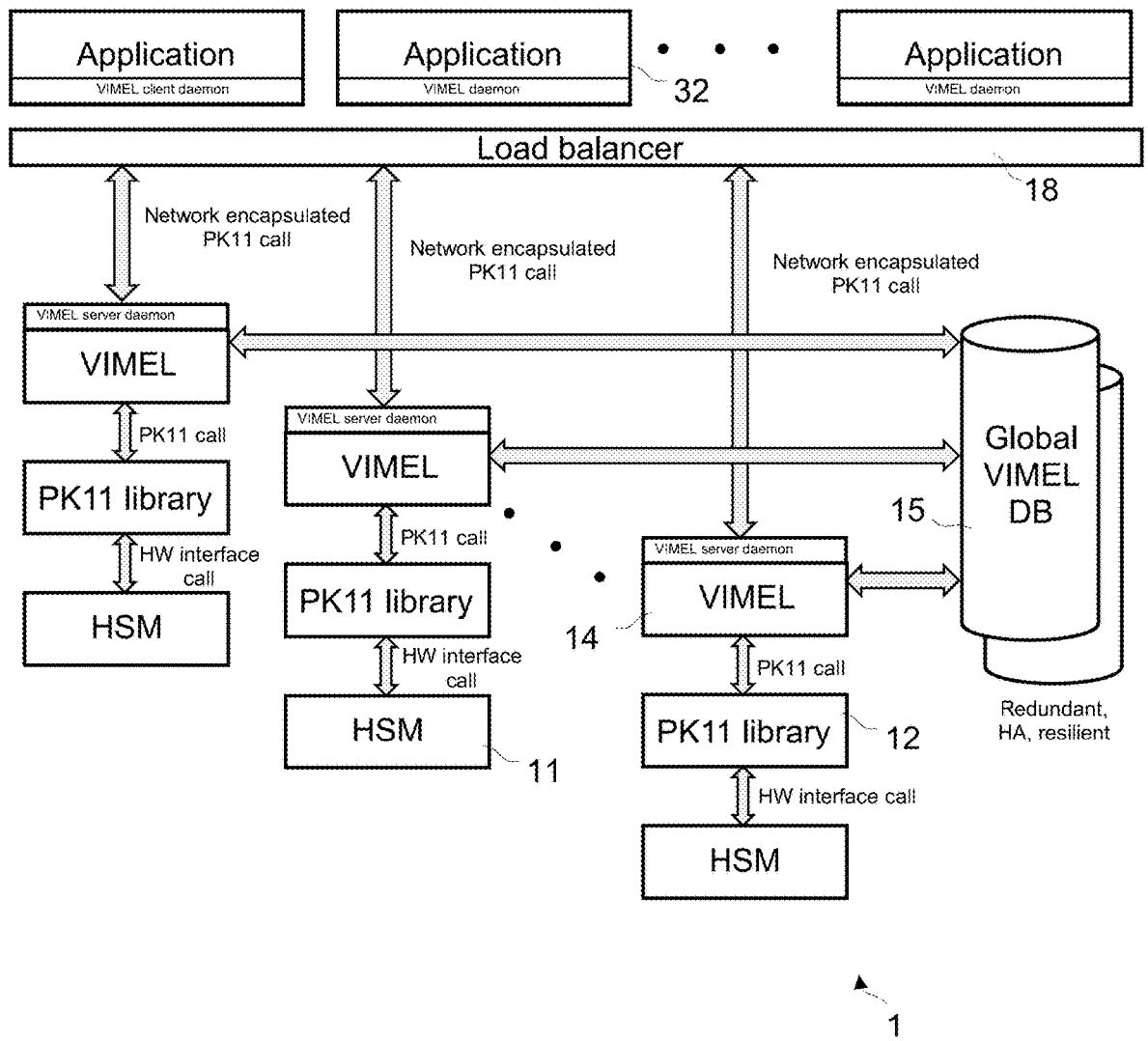
FIG. 3 shows a key management system in a multi-HSM configuration, as in various embodiments of the invention.

This method is implemented in the context of a key management system 1, 1a. Examples of high-level architectures of such systems are shown in FIGS. 1-3. The system 1, 1a comprises one or more hardware security modules (HSMs) 11, each implementing a secure memory 11m in their respective enclosures. Such modules are known per se.

As illustrated in FIG. 1, the key management system 1 is generally designed to enable clients 31 to interact with one or more HSMs 11 in order for the clients to obtain COs, which typically consists of cryptographic keys (e.g., wrapped keys such as key 112e in FIG. 4) and/or initialization vectors. The clients 31 may for instance be implemented in a cloud 30, e.g., as containers, virtual machines, or respective computer devices. The computerized clients 31 may possibly have access to respective storage media 41. Such clients 31 interact with HSMs 11 of the system 1 on behalf of users 80 that otherwise interact (computationally speaking) with the clients 31. The system 1 may possibly be implemented as a hierarchical key management system. Such a system 1 actually concerns another aspect of the invention, which is described later in this section.

Let first assume a single-HSM configuration, as illustrated in FIG. 2. A HSM driver, which implements an application programming interface (API) 12, is interfaced with the HSM 11. The HSM driver is preferably implemented as an API library, as assumed in the following. The HSM driver 12 is thus mostly referred to as an API library, and occasionally as a "driver library" or a "driver API" in the following description. The HSM driver 12 is notably configured to provide handles to COs stored on the secure memory of the HSM.

Remarkably here, a shim layer 14 is interfaced with the API library 12, contrary to usual approaches where client applications directly communicate with the API library. In that respect, the present shim layer 14 is nevertheless configured to enable a client application 32 to interact (e.g., transparently) with the HSM 11, via the API library 12. This way, the HSM can still manage COs for the client application 32, notwithstanding the presence of the shim layer 14. Note, the shim layer 14 is preferably implemented as a library, as assumed in the following description (although it may also be implemented as a microservice, in variants). The shim layer 14 is therefore referred to as a "shim library" or, simply, a "shim", in the following description.

Moreover, external memory storage means 15 are provided, which may comprise one or more devices, implementing databases and/or key-value stores, for example. Unlike the secure memory 11m, the memory storage 15 resides outside the HSM 11. The memory storage means 15 are interfaced with the shim library 14, so as to act as a virtual memory extension layer for the HSM, thanks to operations as described below.

Namely, the shim library 14 is designed to securely export COs from the HSM 11, in order to eventually be able to free up S180 memory space on the secure memory 11m, as illustrated in FIG. 1. That is, the shim layer 14 may instruct to encrypt S140 such COs (via the API library 12) and store S150 encrypted versions thereof at respective memory locations on the external storage means 15.

In addition, the shim layer shall instruct to store S170 handles (i.e., abstract references) to such COs along with additional references to the memory locations at which the encrypted objects are stored. The handles and additional references are also stored on the external storage means 15.

The present API library 12 is preferably a platform-independent library, designed in such a way that whenever a CO (e.g., a cryptographic key) is placed inside the HSM 11, the API library 12 provides a handle (e.g., upstream to the application) for further reference to this CO, i.e., in order to allow applications 32 to later use this CO. A handle is an abstract reference to a CO, which is used by application software when the latter needs to reference a CO, it being reminded that this CO is in fact managed by and stored inside the HSM 11.

The API library 12 includes subroutine definitions, communication protocols, as well as other tools to enable communication between the computerized components 11, 32. This library 12 is preferably a standard driver API for HSMs, such as the so-called PKCS #11 standard (or "PK11" for short, as used in the accompanying drawings). In detail, PKCS #11 is a public-key cryptography standard that defines a platform-independent API, that is, a programming interface to create and manipulate cryptographic tokens as needed in HSMs. This API notably defines the most common CO types, such as RSA keys, X.509 Certificates, DES/Triple DES keys, AES keys, etc., as well as functions needed to manage (i.e., use, create or generate, modify and delete) such objects in practice. More generally, other standard may possibly be relied upon. Yet, as most software packages are designed to use a standard driver API, it is preferred not to modify the driver API 12, whence the benefit of using, instead, a shim layer 14 on top of the API library 12, i.e., interfaced between the application level 32 and the driver API 12.

The shim layer 14 is a (typically small) library designed to transparently relay requests (as to COs) from an application 32, e.g., by changing arguments passed in calls to the API library 12, upon intercepting such calls. In addition, the shim layer 14 shall perform a number of operations, in order to export and possibly re-import COs to/from external storage means 15 from/to HSMs 11, as in embodiments discussed below.

Essentially, the shim layer 14 transparently manages COs and handles thereto, in order to export COs to the external storage means 15, which eventually makes it possible to free up memory space on the HSM 11 (e.g., if and as necessary, which may possibly require to monitor the memory available in the HSM's enclosure). Advantageously, this scheme does not require to modify the driver API library 12, such that application-level software need not be modified either. That is, the shim layer 14 works, together with the external storage 15, as a virtual memory extension layer (whence the acronym VIMEL used in the accompanying drawings).

The storage means 15 may possibly be distributed. Preferably, such means 15 reside in a dedicated space of the system 1 (not in the client's space, not in the users' space). In variants, the external storage means 15 may be (at least partly) constituted by storage media 41 of the computerized client 31. Such external media 41 are, e.g., attached to or in close data communication with the clients 31. The media 41 reside in the client space (not in the users' space), where COs can still be relatively securely stored. The external storage media 41 may for instance include, each, a database. Many other architectures can be contemplated, as the skilled person will acknowledge. The exact physical configuration of the external memory storage means 15 is not critical, as long as it allows reasonable access times.

The external memory 15 may for instance implement one or more databases. It may also be configured as a key-value store (KVS), for example. Also, the encrypted objects need not necessarily be stored on the same device as the handles and associated references. In the present context, what matters is that this memory 15 does not reside in the HSM's enclosure.

The cryptographic objects may notably include cryptographic keys, which may comprise symmetric keys and/or asymmetric keys (such as key 112 in FIG. 4), as well as initialization vectors (IVs). IVs are used as input to cryptographic primitives, along with secret keys for data encryption. That is, such vectors are used as an additional random input to the encryption algorithm, so that the result of encrypting same clear data differs each time a different initialization vector is used.

Figure 5:
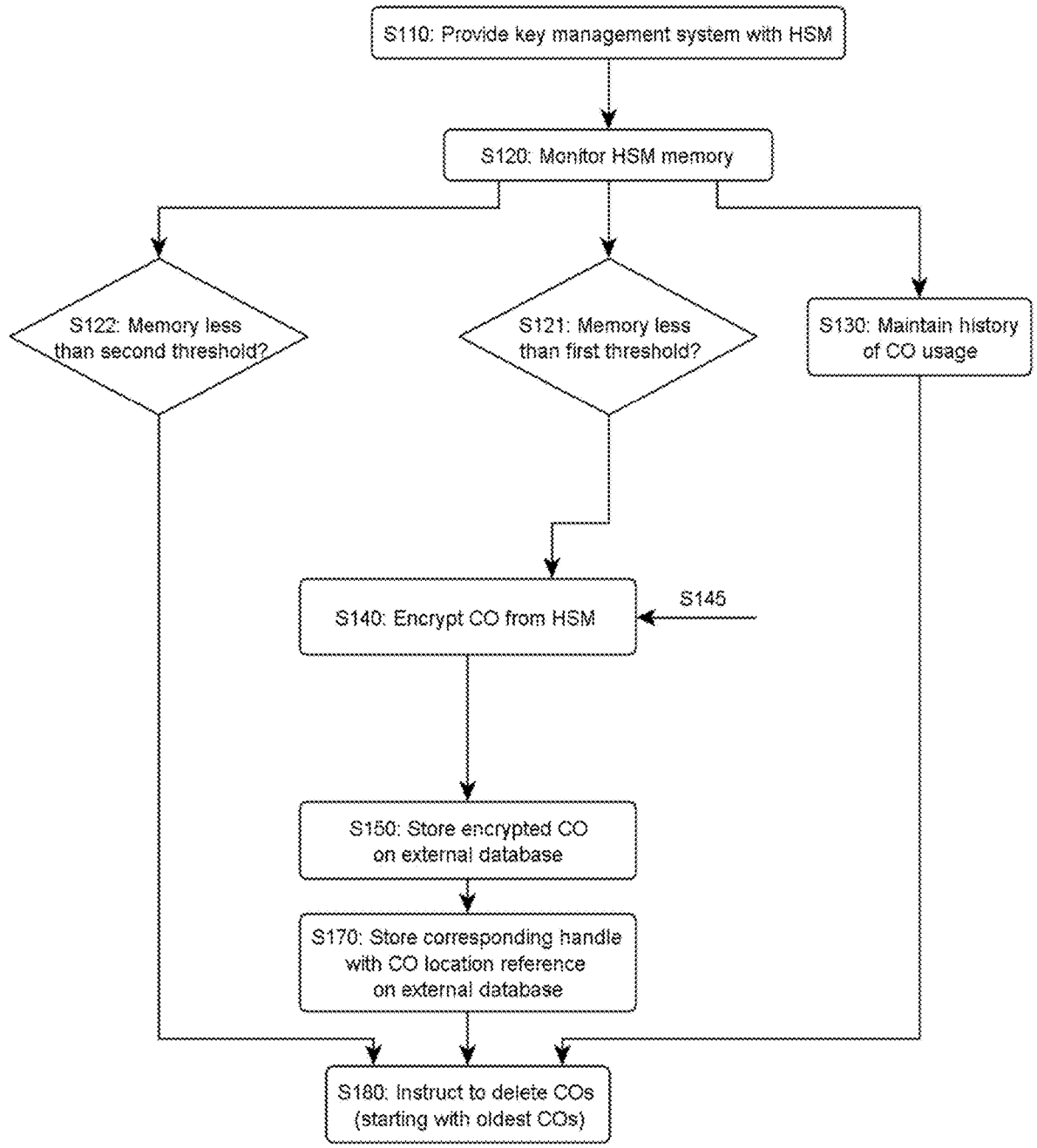
FIGS. 5-7 are flowcharts illustrating high-level steps of methods for managing cryptographic objects, according to embodiments.

Referring now more specifically to FIG. 5, the present methods may further comprise additional steps to monitor S120 the amount of memory that is still available on the secure memory of the HSM 11. In turn, step S120 impacts steps S140 and S170. That is, whether to encrypt S140 the COs and store S170 handles thereto is carried out dependent on the residual memory.

The memory on the HSM 11 may primarily be monitored at the HSM (corresponding data will be passed by the HSM to the shim layer 14) and/or at the shim library 14. The shim library 14 may for example continually (e.g., periodically) read the residual amount of free memory on the HSM 11. In variants, the available memory is monitored by the shim library 14, independently from the HSM (i.e., directly and without soliciting the HSM for that purpose). The shim 14 may for example keep track of the memory used by monitoring PKCS #11 calls to update a status of the memory still available at the HSM 11, e.g., by decrementing/incrementing a counter. Various models may in fact be implemented at the shim 14 to infer the current status of the available memory at the HSM 11, as the one skilled in the art will appreciate.

As further seen in FIG. 5, A CO is preferably deleted S180 from the secure memory 11m of the HSM, after it has been exported S140, S150, i.e., after having instructed to encrypt S140 the COs and store S150 its encrypted version on the external storage 15. Note, COs may possibly be deleted immediately after having been exported. In preferred variants, however, the COs are maintained for some time on the HSM 11, the memory permitting. Namely, the deletion of COs is preferably deferred for a time period that is defined based on the monitoring S120 of the secure memory 11m. E.g., two different thresholds 121, 122 may be used for the memory fill: a first memory threshold S121 may be used determine whether to proactively export COs, whereas a second threshold (corresponding to a lower residual memory available) may be used to effectively delete the COs from the HSM memory 11m.

Thus, the shim library 14 may for example decide S121 to export COs depending on the amount of memory still available at the HSM 11, but nevertheless leave the corresponding instances of COs in the HSM's memory 11m. More precisely, the shim may not immediately delete the corresponding instances of COs as such instances can be deleted at a later stage when the available memory becomes S122 more critical at the HSM 11. This has the additional benefit that when a CO need eventually be deleted from the HSM 11 due to critical memory, this object just has to be deleted on the HSM 11, which is a fast operation. I.e., this CO does not have to be encrypted and exported, since this operation was already done earlier, in a proactive manner.

In other variants, COs are automatically deleted after a timeout has elapsed. In all cases, operations carried out at steps S140-S180 can possibly be performed element by elements (CO by CO, as suggested by the flowchart of FIG. 5) or, preferably, for batches of COs (e.g., containing hundreds of COs). That is, batches of COs will preferably be exported all together, so as to minimize interactions with the HSM 11.

In that respect, use shall preferably advantageously be made of a history of usage of the COs, e.g., as maintained by the shim library 14. This makes it possible for the shim 14 to determine S130 an order in which COs can be exported S140, S150 from the secure memory 11m. The shim may for example proactively export COs that were not used for a long time (e.g., export the oldest COs first). More sophisticated algorithms may possibly be used by the shim library 14 to select COs to be exported, e.g., involving suitably trained cognitive models.

Figure 6:
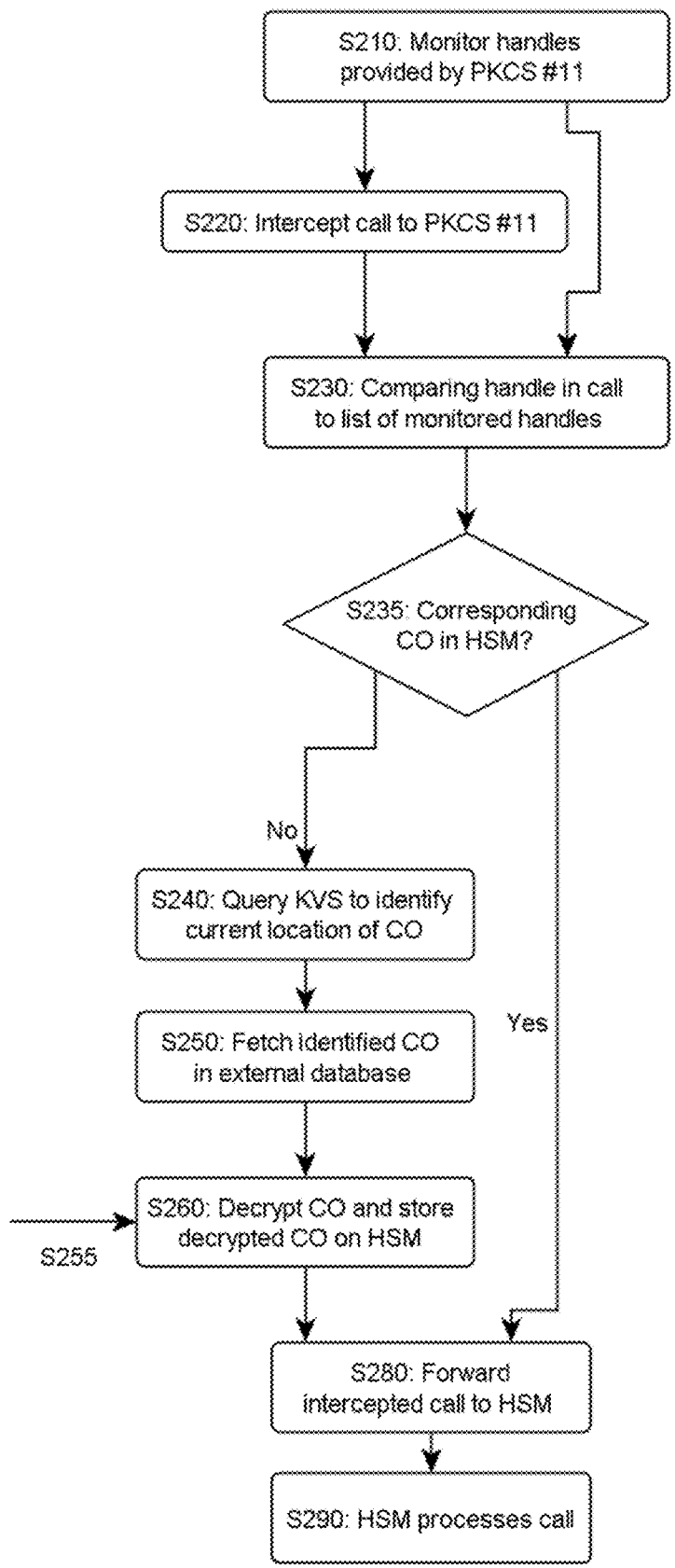
Figure 7:
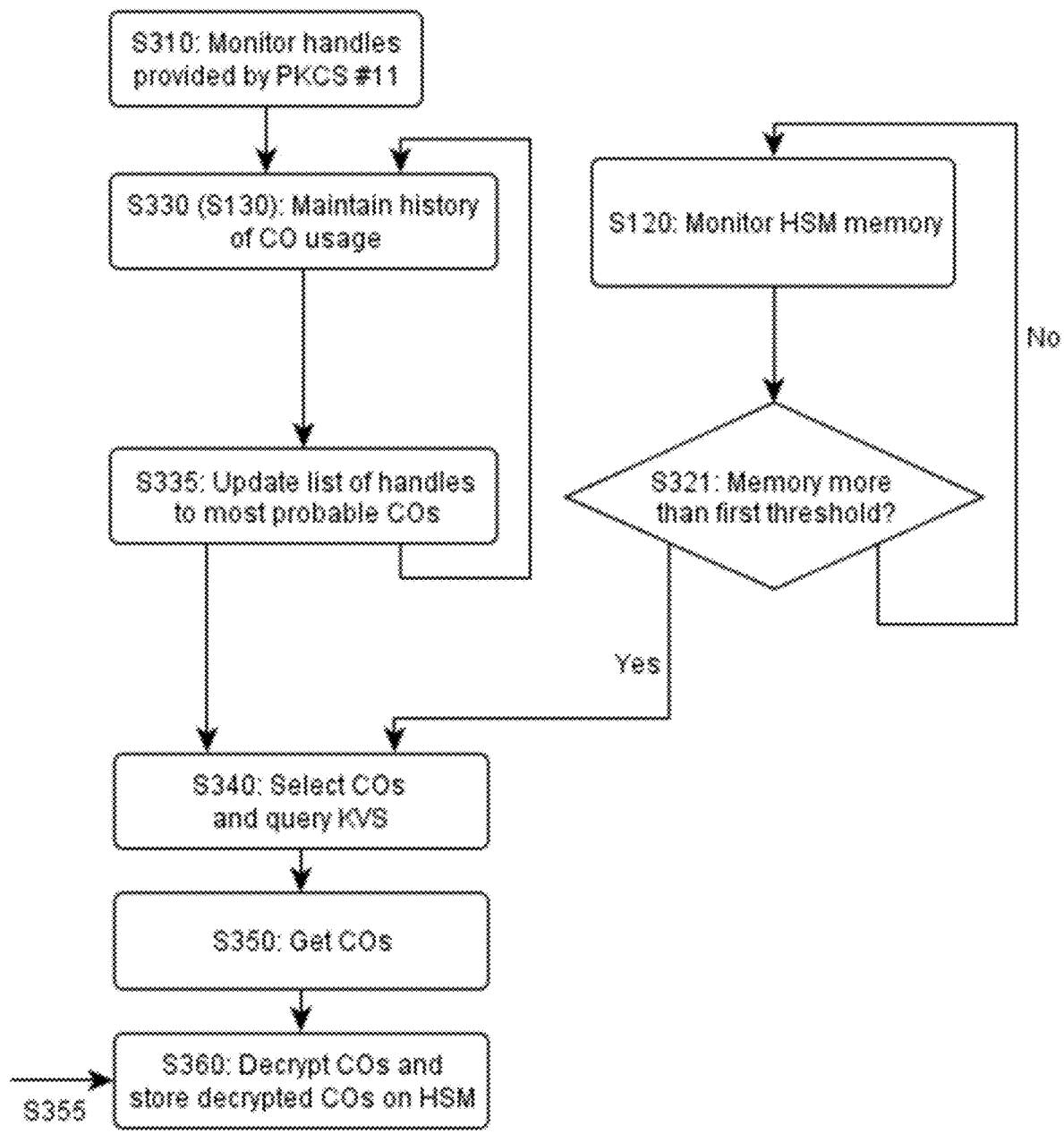

Referring now to FIGS. 6 and 7, in embodiments, the shim library 14 monitors S210, S310 handles provided by the API library 12, in order to be able to proactively export COs or re-import them, as necessary. To that aim, handles are monitored, irrespective (but keeping track) of whether the corresponding COs are currently stored. I.e., the monitored handles include, on the one hand, handles to cryptographic objects that are currently stored on the secure memory 11m and, on the one hand, handles to cryptographic objects that are currently stored on the external storage means 15. Note, some of the COs may currently be stored on both places, owing to the temporization instituted by steps S120, S121, S122.

And this may notably include monitoring handles as used in calls made by a client application 32 to the API library 12. That is, client applications reference COs by means of handles in calls made to the API library 12; such calls can be monitored 210, 310 at the shim 14 along with corresponding handles. More generally, since the shim 14 is interfaced with the API library 12, the shim may monitor all handles provided by the API library 12. Monitoring such handles notably allows the shim to maintain S130, S330 a history of COs, which, in passing, makes it further possible for the shim to infer the residual amount of memory available at the HSM 11.

Based on the monitored handles, the shim 14 may proactively export COs, whereby the shim instructs to encrypt S140 COs (again, with the help of the API library) and store S170 corresponding handles. For example, the shim library 14 may keep track of all PKCS #11 handles (whether the corresponding COs are stored inside the HSM 11 or not, i.e., on the external storage 15) and then decide to proactively export COs S140-S170. Still, the shim may not instruct to immediately delete the corresponding COs, as previously discussed in reference to FIG. 5.

In addition, monitoring S210 handles makes it later possible to re-import the COs, when necessary (FIG. 6). For example, the shim 14 may intercept S120 calls made by a client application 32 to the API library 12. Then, for each intercepted call, the shim 14 takes steps to retrieve S230-S260 a CO referenced in the intercepted call. This can easily be achieved by comparing S230 the handle used in this call to handles as monitored S210 at the shim library 14, as exemplified in the embodiment of FIG. 6, which is now discussed in detail.

To start with, the shim 14 may for instance determine S235 whether a CO as referenced in an intercepted call is currently stored on the secure memory 11m or stored encrypted on the external memory 15, by comparing S230 the corresponding handle to the monitored handles (i.e., an updated list of handles). Next, if the shim 14 determines (S235: Yes) that the referenced object is currently stored on the secure memory 11m, it simply forwards S280 the intercepted call to the HSM 11 (via the API library 12). The HSM 11 subsequently provides S290 the CO as referenced in the call or perform an operation involving this CO.

If, however, the shim determines (S235: No) that the referenced object is currently stored (in encrypted form) on the external memory 15, then this CO is re-imported into the HSM 11. To that aim, the shim 14 will first identify S240 the memory location of the referenced CO on the external storage 15. This can be achieved by identifying the reference associated to the handle corresponding to the object referenced in the intercepted call. The encrypted object stored at the memory location corresponding to the identified S240 reference will then be fetched S250 and decrypted S260, by way of instructions passed to the API library, for it to cause S255 the HSM to decrypt the encrypted object. Once the decrypted object has been stored S260 on the HSM 11, the intercepted call can be forwarded S280 to the HSM 11. The latter can accordingly provide S290 the CO referenced in this call or perform an operation therewith, as requested in the call.

For example, whenever the application 32 uses a handle in a PKCS #11 call, the shim library 14 intercepts this call, checks where the CO is currently located (i.e., on the HSM or the external storage 15), based on a lookup table maintained by the shim. If this CO happens to be inside the HSM, the shim library 14 forwards the application's PKCS #11 call to the HSM. If the CO is instead recognized to reside in the external storage, the shim library identifies the exact storage location or address in the external storage. This is preferably achieved using a key-value map, wherein the key of the key-value pair is the handle corresponding to the referenced CO, whereas the value returned may be the location reference of the previously exported CO or the CO itself. Next, the shim causes to transparently decrypt (or unwrap) the CO (by way of instructions to the HSM suitably relayed by the API layer) to re-import this object into the HSM and only then forwards the PKCS #11 call to the HSM, for subsequent processing.

Figure 4:
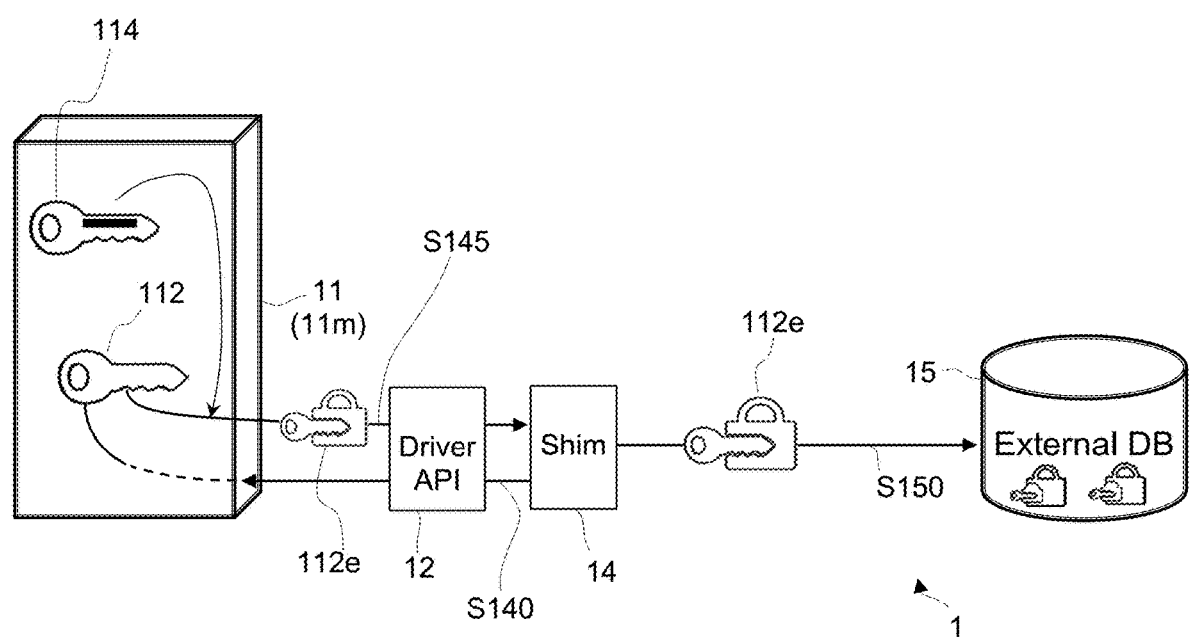
FIG. 4 illustrates selected steps of a method for exporting cryptographic objects (such as cryptographic keys), thanks to a shim layer interfaced to a HSM via a HSM driver, implementing an application programming interface, or API, as in embodiments.

Note, the encryption S140 and decryption S260 steps are preferably carried out under the control of the shim library 14, thanks to one or more keys 114 made available S114 by the HSM 11, as illustrated in FIG. 4. This key 114 may for example be generated as a CO in the memory 11m of the HSM 11 during start-up and then used to export and import COs 112e controlled by the shim 14. For example, the shim library 14 may instruct S140 the HSM (via the driver API 12) to wrap S145 the key 112, in order to subsequently export the wrapped key 112e from the HSM. The plain value of the import/export key 114 will, however, never leave the HSM 11 for security reasons. As long as this key 114 is available in the HSM, encrypted (wrapped) keys 112e as stored on the external DB 15 can be re-imported to the HSM 11 whenever required.

In addition to monitoring S310 handles, the shim 14 shall preferably maintain and continually updates S335 a list of most probable COs, i.e., COs which are likely to be referenced in future calls to the API library 12, as illustrated in FIG. 7. This way, the shim 14 may proactively retrieve S335-S360 objects stored on the external storage means 15, based on the updated list. Whether to proactively retrieve COs will also depend S321 on the current state of the HSM memory, as monitored at step S120. Steps S340-S360 are otherwise essentially similar to steps S240-S260 of FIG. 6. They notably involve a decryption instruction S360 relayed by the API layer, causing S355 the HSM to decrypt COs retrieved.

Note, the algorithm used by the shim library 14 to select which COs to export or re-import can be optimized for different use cases. As discussed earlier, the shim may proactively export S140-S170 COs that have not been used for a long time (e.g., export the oldest COs first), for example. And the shim may similarly proactively re-import COs based S310 on the PKCS #11 call history. E.g., if a given CO is currently being used, chances are that another (e.g., related CO) will be used shortly after that. In that respect, the shim 14 may advantageously exploits correlations between COs, which may for example be revealed using a suitably trained cognitive model.

Referring back to FIGS. 1-3, another aspect of the invention is now described, which concerns a key management system 1, 1*a* for managing COs. Essential aspects of this system 1, 1*a* have already been discussed earlier in reference to the present methods. Therefore, the key management system 1, 1*a* is only briefly described in the following.

As said, this system 1, 1*a* notably comprises a HSM 11, equipped with a secure memory 11*m*. It further includes an API library 12, interfaced with the HSM 11. The system additionally comprises a shim library 14, which is interfaced with the API library 12, as well as external memory storage means 15 (arranged outside the HSM's enclosure 11), which are interfaced with the shim library 14.

As explained earlier in detail, the shim library 14 is configured to enable a client application 32 to interact with the HSM 11 via the API library 12 for the HSM to manage COs for the client application, notwithstanding the shim library. The shim 14 is otherwise configured to proactively export COs, in order to be able to free up memory space on the secure memory 11*m*, and may possibly re-import such COs, e.g., on demand or proactively, as discussed earlier.

The external storage means 15 may for instance comprise (or even consist of) a key-value store (KVS), on which handles are stored along with references to memory locations of the COs. The COs may themselves either be stored (in encrypted or wrapped forms) on the KVS or on a database coupled thereto. The KVS is adapted to return, in response to a query including a handle (corresponding to a handle stored thereon), an associated reference (e.g., a memory address) to a memory location of a corresponding CO (e.g., if the latter is stored on a distinct storage device), or even the CO itself (if the latter is stored on the KVS, i.e., at a location corresponding to the reference associated to the query handle).

FIG. 2 depicts a system 1*a* involving a single HSM 11. However, in variants such as illustrated in FIGS. 1 and 3, the system 1 may include a set of HSMs 11, each equipped with a respective secure memory 11*m*, as well as corresponding sets of HSM drivers 12 (e.g., implemented as API libraries, as assumed in the following) and shim layers 14 (e.g., shim libraries, as assumed in the following). Each stack 11, 12, 14 is otherwise configured similarly as the stack of FIG. 2, except that the shims 14 all interact with same external memory storage means 15 (e.g., with the same group of storage devices). In variants, one or each of the shims 14 may possibly be interfaced (each) with more than one API libraries, which can themselves be interfaced (each) with more than one HSMs.

As further seen in FIG. 3, the system 1 may additionally comprise a load balancer 18, designed to distribute the load from client applications 32 to the various HSMs 11. For example, several shim layers 14 may cooperate to import keys to other HSMs and thereby make up a so-called ACID multi-HSM installation. ACID stands for "Atomicity, Consistency, Isolation, Durability", i.e., a set of properties of database transactions intended to guarantee validity even in the event of errors, power failures, etc. This may for instance be achieved by adding a HSM identifier (via the driver API) to each handle before feeding it back to the application 32. This way, a single-HSM-handle can be converted to a global-HSM handle. Advantageously, such a scheme remains fully transparent for an application 32: PKCS #11 calls can still be executed in a multi-HSM installation. Yet, the keys 114 invoked by the shim layers 14 to encrypt/decrypt upon exporting/importing COs need all be identical on all involved HSMs 11 in that case. Thus, such keys 114 can for instance be proactively be (securely) distributed or cloned on all HSMs 11 during set-up. There are several methods known to clone a key from one HSM to another HSM. For example, public/private key pairs can be leveraged to wrap the key 114 on the source HSM 11 with the public key of the target HSM and unwrap it with the private key onto the target HSM.

As further seen in FIG. 3, suitable interfacing with client applications can be ensured via daemon processes running as background processes both at the clients and the shim layers. Using such server and client daemons makes it notably possible to well separate applications from the shim layers. In particular, instead of using (co-packaged) library functions (in which case an application and a respective shim layer would form a single program), a client and server daemons configuration such as shown in FIG. 3 enables library calls via the network through which applications and shim layers are connected. This, in turn, makes it possible to use a load balancer 18, as assumed in the embodiment of FIG. 3, so as to be able to optimize the workload distribution.

Next, according to a final aspect, the invention can be embodied as a computer program product for managing COs in a system 1, 1*a* such as described above. This computer program product comprises a computer readable storage medium having program instructions embodied therewith, where the program instructions are executable by one or more processors of the system (e.g., processors that are 'close' to the HSMs), to cause the latter to take steps according to the present methods.

This program is essentially run at (or as part of) the shim layer 14, in operation. It will, however, cooperate with other programs run at the clients 31 and at (or as part of) the API layers 12, in operation. Many possible architectures can be contemplated, as the person skilled in the art will appreciate. Additional aspects of the present computer programs are discussed in detail in sect. 2.2.

The above embodiments have been succinctly described in reference to the accompanying drawings and may accommodate a number of variants. Several combinations of the above features may be contemplated. Examples are given in the next section.

2. Specific Embodiments and Technical Implementation Details

2.1 Specific Embodiments

In particularly preferred embodiments, a shim key 114 is generated on the HSM during start-up. This key is then used to export and import keys 112/112*e* controlled by the shim 14, which issues the relevant commands to the driver API 12. The shim 14 keeps track of all PKCS #11 handles being used, be the associated keys stored on the HSM's secure memory 11*m* or on the external storage 15. The shim 14 periodically reads the amount of free memory on the HSM. In variants, it keeps track of this memory by monitoring PKCS #11 calls.

When a predetermined memory fill level is reached, the shim 14 starts exporting keys to the external storage by encrypting the keys 112 with the shim key 144 and then deleting the key on the HSM 11, so as to free up memory on the HSM 11. The shim 14 then stores the original handle (along with associated references to the memory location of the COs on the external storage 15) on a key-value store for later identification of the locations of the keys 112*e*. Note, the external storage 15 may possibly be distributed and have high-availability and resiliency functionalities.

Whenever an application 32 uses a handle in a PKCS #11 call, the shim 14 intercepts this call, checks where the corresponding key currently is (on the HSM or external storage). If the key is inside the HSM, the shim forwards the PKCS #11 call to the HSM. If the key is recognized to reside in the external storage, the shim identifies the exact memory location using a key-value map. Next, the shim 14 transparently re-imports (and instructs to decrypt, unwrap) the key, which involves the shim key 114, by way of instructions directed to the HSM via the driver API 12 and only then forwards the applications PKCS #11 call to the HSM via Driver API 12, as described earlier in reference to FIG. 6.

In addition, the shim may proactively export keys. It may similarly re-import keys as a function of the PKCS #11 call history. Interestingly, the proactive export scheme may nevertheless leave the keys 112 for some time on the HSMs, as noted earlier. If the memory fill level becomes too critical, keys 112 can simply be deleted from the HSMs as such keys have already been exported (in encrypted form).

Finally, several instances of the shim layers 14 may possibly cooperate to achieve an ACID multi-HSM installations, as noted in sect. 1.

2.2 Aspects Concerning Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made, and equivalents may be substituted without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for managing cryptographic objects, the method comprising:
   providing a key management system comprising:
      a hardware security module (HSM), having a secure memory;
      an HSM driver, implementing an application programming interface (API), interfaced with the HSM to provide handles to cryptographic objects stored on the secure memory;
      a shim layer interfaced with the HSM driver, the shim layer configured to enable a client application to interact with the HSM via the HSM driver for the HSM to manage cryptographic objects for the client application, notwithstanding the shim layer; and
      external memory storage, wherein the external memory storage reside outside the HSM and is interfaced with the shim layer, and
   at the shim layer:
      instructing, via the HSM driver, to encrypt cryptographic objects from the HSM and instructing to store the resulting encrypted objects at respective memory locations on the external storage, in order to be able to free up memory space on the secure memory, and
      instructing to store handles to such cryptographic objects along with references to said respective memory locations, on the external storage, the handles comprising abstract references to said cryptographic objects, usable by application software to reference a corresponding one of the cryptographic objects, the application software being reminded that the corresponding one of the cryptographic objects is in fact managed by and stored inside the HSM;
   wherein the method further comprises monitoring a memory available on the secure memory, whereby instructing to encrypt the cryptographic objects and store handles thereto is carried out dependent on the monitored memory; and
   wherein instructing to encrypt the cryptographic objects and store handles thereto is carried out dependent on the monitored memory being less than a first threshold, further comprising deleting an oldest one of said cryptographic objects, already stored in said external storage, from said secure memory of said HSM, based on said monitored memory also being less than a second threshold, lower than said first threshold.

2. The method according to claim 1, wherein this available memory is monitored by the shim layer.

3. The method according to claim 1, wherein at deleting, the deletion of the cryptographic objects is deferred for a time period determined based on the monitored memory.

4. The method according to claim 1, wherein the method further comprises, at the shim layer, monitoring ones of the handles provided by the HSM driver, wherein such ones of the handles include, on the one hand, first handles to cryptographic objects currently stored on the secure memory and, on the other hand, second handles to cryptographic objects currently stored on the external storage.

5. The method according to claim 1, wherein said HSM driver is a standard, platform-independent application programming interface library.

6. The method according to claim 1, wherein said cryptographic objects comprise one or each of:
   cryptographic keys, including symmetric keys and/or asymmetric keys; and
   initialization vectors.

7. A computer-implemented method for managing cryptographic objects, the method comprising:
   providing a key management system comprising:
      a hardware security module (HSM), having a secure memory;
      an HSM driver, implementing an application programming interface (API), interfaced with the HSM to provide handles to cryptographic objects stored on the secure memory;
      a shim layer interfaced with the HSM driver, the shim layer configured to enable a client application to interact with the HSM via the HSM driver for the HSM to manage cryptographic objects for the client application, notwithstanding the shim layer; and
      external memory storage, wherein the external memory storage reside outside the HSM and is interfaced with the shim layer, and
   at the shim layer:
      instructing, via the HSM driver, to encrypt cryptographic objects from the HSM and instructing to store the resulting encrypted objects at respective memory locations on the external storage, in order to be able to free up memory space on the secure memory, instructing to store handles to such cryptographic objects along with references to said respective memory locations, on the external storage;

monitoring ones of the handles provided by the HSM driver, wherein such ones of the handles include, on the one hand, first handles to cryptographic objects currently stored on the secure memory and, on the other hand, second handles to cryptographic objects currently stored on the external storage;

wherein:

monitoring said ones of the handles comprises intercepting calls made by the client application to the HSM driver; and the method further comprises, at the shim layer and for each call of the intercepted calls, retrieving a cryptographic object referenced in said each call by comparing a corresponding handle in said each call to handles as monitored at the shim layer.

8. The method according to claim 7, wherein retrieving said cryptographic objects further comprises, for said each call, determining whether the cryptographic object referenced in said each call is currently stored on the secure memory or stored encrypted on the external storage, by comparing the corresponding handle to handles as monitored at the shim layer.

9. The method according to claim 8, wherein the method further comprises, if it is determined that the referenced object is currently stored on the secure memory, forwarding said each call to the HSM via the HSM driver for the HSM to provide the cryptographic object as referenced in said each call.

10. The method according to claim 8, wherein the method further comprises, if it is determined that the referenced object is currently stored encrypted on the external storage:

identifying, on the external storage, a reference associated to a handle corresponding to the referenced object, and obtain the encrypted object as stored at a memory location corresponding to the identified reference;

decrypting the object obtained for it to be stored on the HSM; and after having stored the decrypted object on the HSM, forwarding said each call to the HSM for it to provide the cryptographic object as referenced in said each call.

11. The method according to claim 10, wherein encrypting and decrypting a cryptographic object is carried out under control of the shim layer, whereby the latter instructs the HSM driver to cause the HSM to use one or more cryptographic keys available at the HSM, in order to encrypt and decrypt said cryptographic object.

12. A computer-implemented method for managing cryptographic objects, the method comprising:

providing a key management system comprising:

a hardware security module (HSM), having a secure memory;

an HSM driver, implementing an application programming interface (API), interfaced with the HSM to provide handles to cryptographic objects stored on the secure memory;

a shim layer interfaced with the HSM driver, the shim layer configured to enable a client application to interact with the HSM via the HSM driver for the HSM to manage cryptographic objects for the client application, notwithstanding the shim layer; and external memory storage, wherein the external memory storage reside outside the HSM and is interfaced with the shim layer, and at the shim layer:

instructing, via the HSM driver, to encrypt cryptographic objects from the HSM and instructing to store the resulting encrypted objects at respective memory locations on the external storage, in order to be able to free up memory space on the secure memory, instructing to store handles to such cryptographic objects along with references to said respective memory locations, on the external storage;

monitoring ones of the handles provided by the HSM driver, wherein such ones of the handles include, on the one hand, first handles to cryptographic objects currently stored on the secure memory and, on the other hand, second handles to cryptographic objects currently stored on the external storage;

wherein the method further comprises, at the shim:

updating a list of most probable cryptographic objects to be referenced in future calls to the HSM driver; and proactively retrieving cryptographic objects stored on the external storage, based on the updated list and a memory available on the secure memory.

13. A computer-implemented method for managing cryptographic objects, the method comprising:

providing a key management system comprising:

a hardware security module (HSM), having a secure memory;

an HSM driver, implementing an application programming interface (API), interfaced with the HSM to provide handles to cryptographic objects stored on the secure memory;

a shim layer interfaced with the HSM driver, the shim layer configured to enable a client application to interact with the HSM via the HSM driver for the HSM to manage cryptographic objects for the client application, notwithstanding the shim layer; and external memory storage, wherein the external memory storage reside outside the HSM and is interfaced with the shim layer, and at the shim layer:

instructing, via the HSM driver, to encrypt cryptographic objects from the HSM and instructing to store the resulting encrypted objects at respective memory locations on the external storage, in order to be able to free up memory space on the secure memory, and instructing to store handles to such cryptographic objects along with references to said respective memory locations, on the external storage, the handles comprising abstract references to said cryptographic objects, usable by application software to reference a corresponding one of the cryptographic objects, the application software being reminded that the corresponding one of the cryptographic objects is in fact managed by and stored inside the HSM;

wherein the method further comprises determining oldest cryptographic objects in the secure memory based on a history of usage of cryptographic objects, and such cryptographic objects are instructed to be encrypted and subsequently stored on the external storage based on exporting said oldest cryptographic objects first.

14. A key management system for managing cryptographic objects, wherein the system comprises
  a hardware security module (HSM), having a secure memory;
  an HSM driver, implementing an application programming interface (API), interfaced with the HSM to provide handles to cryptographic objects stored on the secure memory;
  a shim layer interfaced with the HSM driver, the shim layer configured to enable a client application to interact with the HSM via the HSM driver for the HSM to manage cryptographic objects for the client application, notwithstanding the shim layer; and
  external memory storage, wherein the latter reside outside the HSM and are interfaced with the shim layer,
  wherein,
    said shim layer is further configured to:
      instruct, via the HSM driver, to encrypt cryptographic objects from the HSM and instruct to store encrypted versions of such objects at respective memory locations on the external storage, in order to be able to free up memory space on the secure memory, and
      instruct to store handles to such cryptographic objects along with references to said respective memory locations, on the external storage, the handles comprising abstract references to said cryptographic objects, usable by application software to reference a corresponding one of the cryptographic objects, the application software being reminded that the corresponding one of the cryptographic objects is in fact managed by and stored inside the HSM;
    wherein the HSM monitors a memory available on the secure memory, whereby instructing to encrypt the cryptographic objects and store handles thereto is carried out dependent on the monitored memory; and
    wherein instructing to encrypt the cryptographic objects and store handles thereto is carried out dependent on the monitored memory being less than a first threshold, wherein the HSM deletes an oldest one of said cryptographic objects, already stored in said external storage, from said secure memory of said HSM, based on said monitored memory also being less than a second threshold, lower than said first threshold.

15. The system according to claim 14, wherein
said external storage comprises a key-value store, on which said handles are stored along with references to said respective memory locations, the key-value store adapted to return, in response to a query comprising a handle corresponding to one of the handles stored on the key-value store, one of:
  an associated one of the references stored on the key-value store; and
  a cryptographic object stored at a location corresponding to said associated one of the references.

16. A key management system for managing cryptographic objects, wherein the system comprises
  a hardware security module (HSM), having a secure memory;
  an HSM driver, implementing an application programming interface (API), interfaced with the HSM to provide handles to cryptographic objects stored on the secure memory;
  a shim layer interfaced with the HSM driver, the shim layer configured to enable a client application to interact with the HSM via the HSM driver for the HSM to manage cryptographic objects for the client application, notwithstanding the shim layer; and
  external memory storage, wherein the latter reside outside the HSM and are interfaced with the shim layer,
  wherein,
    said shim layer is further configured to:
      instruct, via the HSM driver, to encrypt cryptographic objects from the HSM and instruct to store encrypted versions of such objects at respective memory locations on the external storage, in order to be able to free up memory space on the secure memory, and
    instruct to store handles to such cryptographic objects along with references to said respective memory locations, on the external storage;
    wherein the key management system comprises, in addition to said external storage:
      a set of HSMs, including said HSM, each of the HSMs having a respective secure memory;
      a set of HSM drivers, including said HSM driver, wherein each of the HSM drivers is interfaced with at least one of the HSMs to provide handles to cryptographic objects stored on the respective secure memory; and
      a set of a shim layers, including said shim layer, wherein each of the shim layers is
      interfaced with at least one of the HSM drivers and configured to enable a client application to interact with the respective one of the HSMs via said at least one of the HSM drivers for said respective at least one of the HSMs to manage cryptographic objects for the client application, notwithstanding said each of the shim layers,
      interfaced with said external memory storage, and
      otherwise similarly configured as said shim layer, so as instruct, via said at least one of the HSM drivers, to encrypt cryptographic objects, store encrypted versions thereof, and store handles to such cryptographic objects along with references to memory locations of such cryptographic objects on the external storage, in operation.

17. The system according to claim 16, wherein
the system further comprises a load balancer, the latter designed so as to enable client applications to interact with the HSMs.

18. A computer-implemented method for managing cryptographic objects, the method comprising:
  providing a key management system comprising:
    a hardware security module (HSM), having a secure memory;
    an HSM driver, implementing an application programming interface (API), interfaced with the HSM to provide handles to cryptographic objects stored on the secure memory;
    a shim layer interfaced with the HSM driver, the shim layer configured to enable a client application to interact with the HSM via the HSM driver for the HSM to manage cryptographic objects for the client application, notwithstanding the shim layer; and
    external memory storage, wherein the external memory storage reside outside the HSM and is interfaced with the shim layer, and
  at the shim layer:
    instructing, via the HSM driver, to encrypt cryptographic objects from the HSM and instructing to store the resulting encrypted objects at respective memory locations on the external storage, in order to be able to free up memory space on the secure memory, and instructing to store handles to such cryptographic objects along with references to said respective memory locations, on the external storage, the handles comprising abstract references to said cryptographic objects, usable by application software to reference a corresponding one of the cryptographic objects, the application software being reminded that the corresponding one of the cryptographic objects is in fact managed by and stored inside the HSM;

wherein the method further comprises determining an order in which to export cryptographic objects from the secure memory based on a trained cognitive model, and such cryptographic objects are instructed to be encrypted and subsequently stored on the external storage according to the order determined.

\* \* \* \* \*